US012612935B2

(12) United States Patent
Huang

(10) Patent No.: US 12,612,935 B2
(45) Date of Patent: Apr. 28, 2026

(54) CLAMP LOCK

(71) Applicant: Xiang Huang, Doral, FL (US)

(72) Inventor: Xiang Huang, Doral, FL (US)

( * ) Notice: Subject to any disclaimer, the term of this patent is extended or adjusted under 35 U.S.C. 154(b) by 212 days.

(21) Appl. No.: 18/401,375

(22) Filed: Dec. 30, 2023

(65) Prior Publication Data

US 2025/0215912 A1 Jul. 3, 2025

(51) Int. Cl.
  *F16B 12/24* (2006.01)
  *F16B 12/10* (2006.01)
  *F16B 12/26* (2006.01)
(52) U.S. Cl.
  CPC ............. *F16B 12/24* (2013.01); *F16B 12/26* (2013.01); *A47B 2230/0051* (2013.01); *F16B 2012/103* (2013.01); *Y10S 403/11* (2013.01); *Y10S 403/13* (2013.01)
(58) Field of Classification Search
  CPC .. A47B 2230/0051; F16B 12/24; F16B 12/26; F16B 12/36; F16B 12/38; F16B 13/063; F16B 13/0858; F16B 19/10; F16B 19/1027; F16B 19/136; F16B 19/1081; F16B 2012/103; F16B 19/1036; Y10S 403/11; Y10S 403/13
  USPC .................................... 403/DIG. 11, DIG. 13
  See application file for complete search history.

(56) References Cited

U.S. PATENT DOCUMENTS 4,883,396 A * 11/1989 Shamah ................ F16B 13/063
                                                     411/65
7,341,395 B2 * 3/2008 Tseng ..................... F16B 12/26
                                                     403/231

11,703,072 B2 * 7/2023 Boo ........................ F16B 12/26
                                                     403/376
12,173,738 B2 * 12/2024 Ender-Lercher ........ F16B 12/26
2020/0378424 A1 * 12/2020 Vallance ............. F16B 12/2036

FOREIGN PATENT DOCUMENTS

DE     3031048 A1 * 3/1982 ............ F16B 13/065
EP     0019782 A2 * 12/1980 ......... F16B 13/0858
EP     0339428 A1 * 11/1989 ............ F16B 13/063
GB     396815 A * 8/1933 .............. F16B 12/24

OTHER PUBLICATIONS

"Quick-Set 2-parts dowel." KNAPP Connectors. Jun. 28, 2022, [online], [retrieved on Oct. 22, 2025] Retrieved from the Internet <URL: https://web.archive.org/web/20220628092909/https://www.knapp-verbinder.com/en/produkt/quick-set-2-parts-dowel-connector/>.*
Quick-Set—2 Part Locking Dowel—KNAPP Connectors, KNAPP USA, Inc., retrieved May 24, 2023, 10 pages.

* cited by examiner

*Primary Examiner* — Josh Skroupa

(74) *Attorney, Agent, or Firm* — Zhong Law, LLC

(57) ABSTRACT

A clamp lock for connecting a first piece to a second piece of a furniture, comprising a pin, wherein the pin comprises a first end surface and a second end surface, and a plurality of portions that are connected between the first end surface and the second end surface; and a clamp sleeve, wherein the clamp sleeve comprises a hollowed core through a full length of the clamp sleeve, and the clamp sleeve comprises a first portion and a second portion that is connected to the first portion, and wherein the first portion comprises a hollow cylinder, and the second portion comprises a plurality of clamp tongues, each of the plurality of clamp tongues comprising: a first end being connected to the first portion of the clamp sleeve; and a second end comprising a flange.

8 Claims, 10 Drawing Sheets

610

CLAMP LOCK

TECHNICAL FIELD

This disclosure relates to connection systems for joining structural components and in particular, to tool-less connection systems used in the assembly and disassembly of furniture.

BACKGROUND

There are many ways to connect structural components (e.g., parts of a piece of furniture) to each other, such as: tongue and groove joints, mortise and tenon joints and sliding dovetail joints, all of which may provide strong and secure joints. However, all of these known ways require the use of tools of some sort (e.g., screws, nails, bolts, glue), and many result in visible connectors at the joints. When the connectors are visible after assembly of the structural components (e.g., pieces of a furniture), aesthetic appearance of the assembled structure may be negatively affected by unattractive connectors. Additionally, the use of fasteners such as screws or nails to stabilize the furniture is often problematic in the long term as these fasteners become loose with use and movement of the furniture.

Commercialization of ready to assemble ("RTA") furniture and many other RTA wood and plastic products may be hindered by a connection system that requires tools in order to assemble an RTA product. The need for tools complicates the assembly process and may prolong the time needed by a consumer to complete the assembly. For example, a "bag" of hardware elements (e.g., including connectors and tools) may need to be inspected by the consumer and then used to assemble the product.

BRIEF DESCRIPTION OF THE DRAWINGS

The present disclosure is illustrated by way of example, and not by way of limitation, in the figures of the accompanying drawings.

DETAILED DESCRIPTION

It is understood that the present disclosure is intended to be illustrative, and not restrictive, in regard to any features, advantages and embodiments of the clamp lock and connection method described herein.

Embodiments of the disclosure includes a clamp lock for connecting a first piece to a second piece of a furniture. The clamp lock includes a pin, wherein the pin comprises a first end surface and a second end surface, and a plurality of portions that are connected between the first end surface and the second end surface, and a clamp sleeve, where the clamp sleeve includes a hollowed core through a full length of the clamp sleeve, and the clamp sleeve comprises a first portion and a second portion that is connected to the first portion, and where the first portion comprises a hollow cylinder, and the second portion comprises clamp tongues, each of the clamp tongues including a first end being connected to the first portion of the clamp sleeve and a second end comprising a flange.

Embodiments of the clamp lock system are directed to connecting two pieces of furniture or similar structure pieces. At least one hole drilled into one side of a first of the "to be connected" parts (e.g., parts of a piece of furniture). At least one hole drilled into one side of a second of the "to be connected" parts. A clamp lock as described in the disclosure may be used to connect the two pieces of furniture. A first connection element of the clamp lock may include a pin configured to be inserted into the hole of the first of the "to be connected" parts. A second connection element of the connector may include a clamp sleeve configured to be inserted into the hole of the second of the "to be connected" parts. Once the pin of the clamp lock are securely in place in the holes of the first "to be connected" parts, and the clamp sleeve of the clamp lock are securely in place in the holes of the second "to be connected" parts, the pin of the clamp lock may be inserted into the clamp sleeve of the clamp lock, forming a secure connection that is also hidden by the mass of the first and second of the "to be connected" parts.

Embodiments of the clamp lock described herein may be made from a metal or wood or composite material. For example, aluminum or steel may be utilized for a sheet metal type design. Metals may be used for the clamp lock when more shear strength is needed for connecting a particular structure or when structures may be used in high temperature conditions so that the clamp locks do not melt and/or deform. Of course, any suitable materials may be used for the clamp locks if they possess sufficient mechanical qualities for strength and flexibility.

Figure 1A:
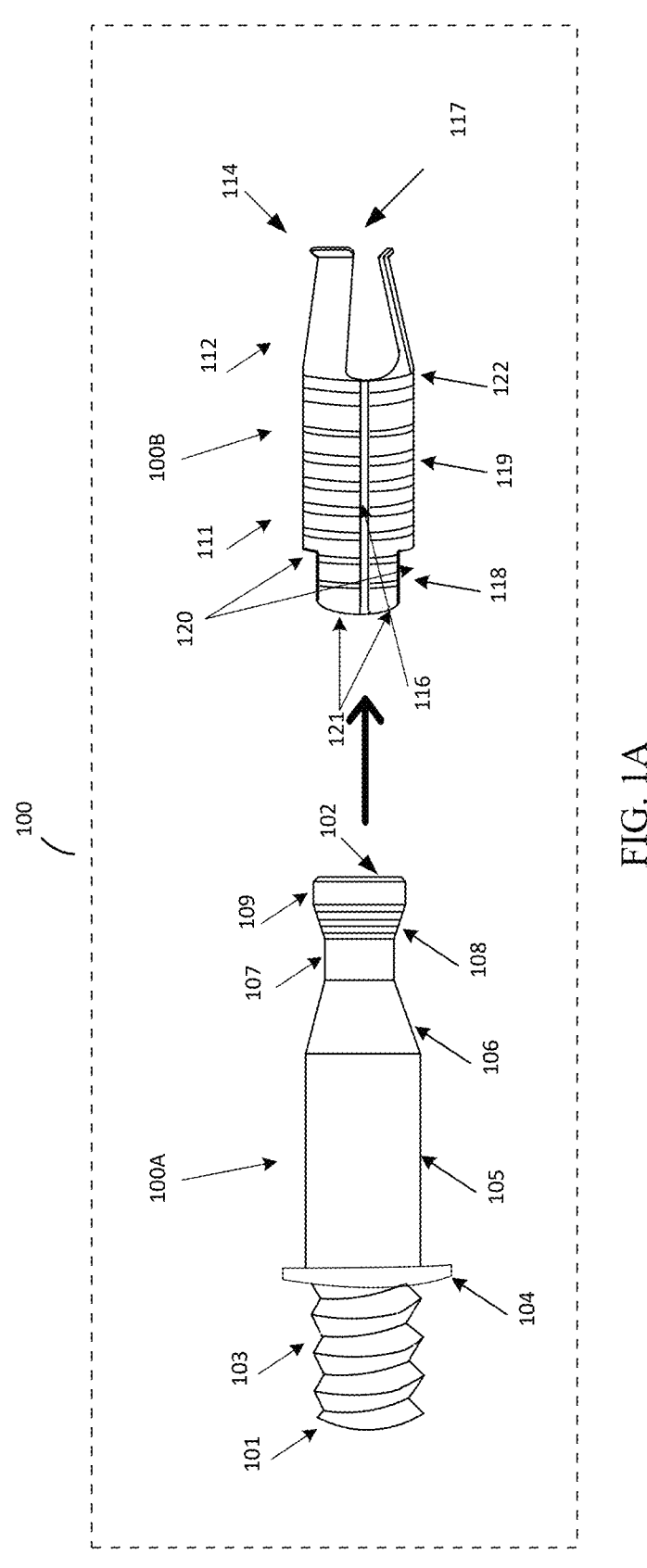
FIGS. 1A and 1B are views of a clamp lock which may include a pin and a clamp sleeve, according to some implementations of the present disclosure.

FIG. 1A is a view of a clamp lock 100 which may include a pin 100A including a first end surface 101 and a second end surface 102, and a plurality of portions that are connected between the first end surface 101 and the second end surface 102. The pin 100A may further include a first substantially cylindrical portion 103 with a threaded outer surface. A flange portion 104 is connected to the first cylindrical portion 103. A second cylindrical portion 105 with a smooth outer surface is connected to the flange portion 104. A cylindrical trapezoid portion 106 with a smooth outer surface is connected to the second cylindrical portion 105. A third cylindrical portion 107 with a smooth outer surface is connected to the cylindrical trapezoid portion 106. A second cylindrical trapezoid portion 108 with a non-smooth or smooth outer surface is connected to the cylindrical portion 107. A forth cylindrical portion 109 with a smooth outer surface and the second end surface 102 is connected to the second cylindrical trapezoid portion 108.

In examples, the pin, as part of the clamp lock, may be made of durable metal materials, enhancing its structural integrity and ensuring robust performance within the furniture assembly. This choice of material may provide the necessary strength and reliability to support the secure interlocking and connection of the first and second pieces of the furniture. In examples, the pin may be molded from metal, steel, and/or aluminum.

The clamp lock 100 for connecting a first part to a second part of a furniture, may further include a second connection element 100B. As shown in FIG. 1A, the second connection element 100B may be a clamp sleeve including a first portion 111, featuring a hollow cylinder, and a second portion 112 connected to the first portion 111. The first portion 111 may have a threaded outer surface, with an external radius and an internal radius smaller than the external radius. The first portion 111 may further include a gap space 116 extending the full length of the clamp sleeve 100B. The first portion 111 may further include a first part 118 and a second part 119. The first part 118 may include two or more opening notches 120 and two or more solid pieces 121 being connected to the second part 119. The second part may be connected to the second portion 112 of the clamp sleeve 100B. The first portion 111 may further include a second end comprising a second annular ring 122. A hollowed core is internally threaded throughout the full length of the first portion 111. The second portion 112 includes a plurality of clamp tongues. The clamp sleeve 100B may further include a radially enlarged annular rim (flange) 114 arranged to stop the cylindrical portion 109 of the pin 100A incident to movement of the pin 100A in the withdrawal direction to prevent withdrawal of the pin 100A from clamp sleeve 100B. The first end of each of the plurality of clamp tongues is connected to the second annular ring 122 of the first portion 111. The plurality of clamp tongues may be oriented in a tilted manner towards a central axis. The second ends of these clamp tongues collectively form an internal circular hole 117. The radius of the internal circular hole 117 may be smaller than the internal radius of the second annular ring 122.

Figure 1B:
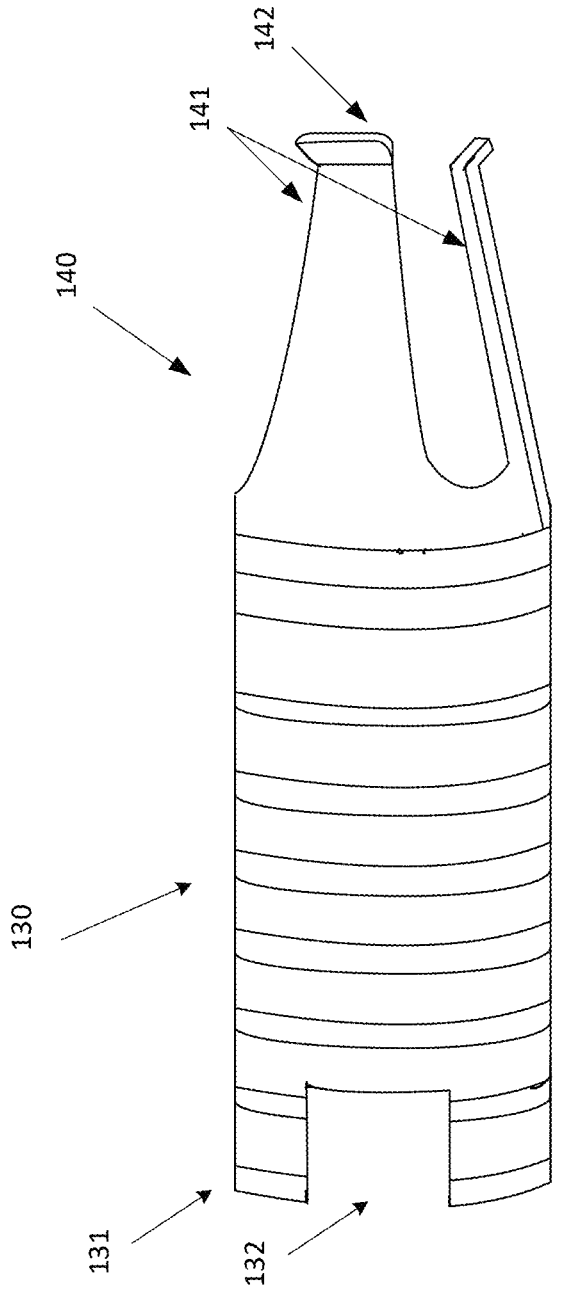

FIG. 1B is another perspective view of the clamp sleeve as described in FIG. 1A, according to some implementations of the present disclosure. As shown in FIG. 1B, the clamp sleeve may include a threaded first portion 130 with a hollow cylindrical structure and a second portion 140. The first portion 130 features a first tubular end 131 with a notch 132. The second portion 140 includes clamp tongues 141 and an annular rim 142 arranged to stop the cylindrical portion of the pin incident to movement of the pin in the withdrawal direction. The first end of each of the plurality of clamp tongues 141 is connected to the first portion 130. The plurality of clamp tongues 141 may be oriented in a tilted manner towards a central axis.

In examples, the first portion and second portion of the clamp sleeve may also be made of metal. The metal employed for the pin and the metal utilized for the clamp sleeve may either be identical materials or differ in composition. This flexibility in material selection allows for customization based on specific requirements, considering factors such as strength, durability, and compatibility with the overall design. Whether opting for a uniform metal composition or a combination of different materials, this adaptability provides versatility in meeting diverse performance and aesthetic considerations within the assembly process. In examples, the clamp sleeve may be molded from metal, steel, and/or aluminum.

Figure 2:
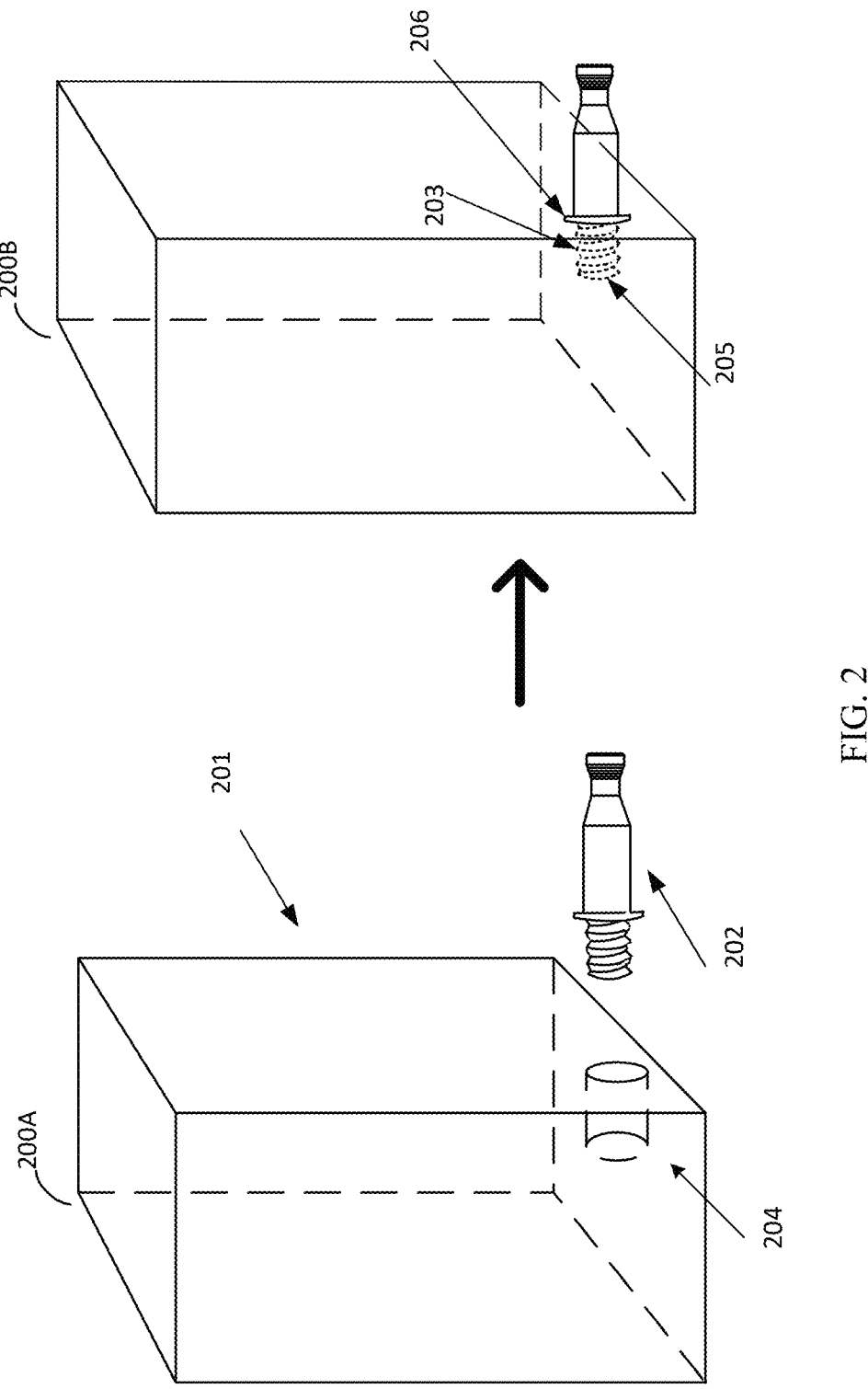
FIG. 2 is a view of the pin screwed into a first hole in a first piece of the furniture, according to some implementations of the present disclosure.

FIG. 2 is a perspective view of a process of a pin screwed into a first hole in a first piece of the furniture, according to some implementations of the present disclosure. As shown in FIG. 2, at 200A, at least a circular hole 204 may be drilled in at least one location on the first piece of furniture 201. At 200B, the pin may be inserted into the drilled hole 204 of the first piece of furniture 201. As noted above, the pin 202 may include a cylindrical portion 203 with a threaded outer surface. Once the pin 202 is inserted into the hole of the first piece of furniture 201, cylindrical portion 203 may threadedly engage the hole 204 through the external threads. A screwdriver may be used to screw the cylindrical portion 203 into the hole 204 or a hammer can be used to force the cylindrical portion 203 into the hole 204. As noted above, a flange portion of the pin is connected to the first cylindrical portion. As shown in FIG. 2, the first cylindrical portion 203 may be inserted into the hole 204 until the flange portion 206 abuts against the outer surface of the of the first piece of furniture.

Figure 3:
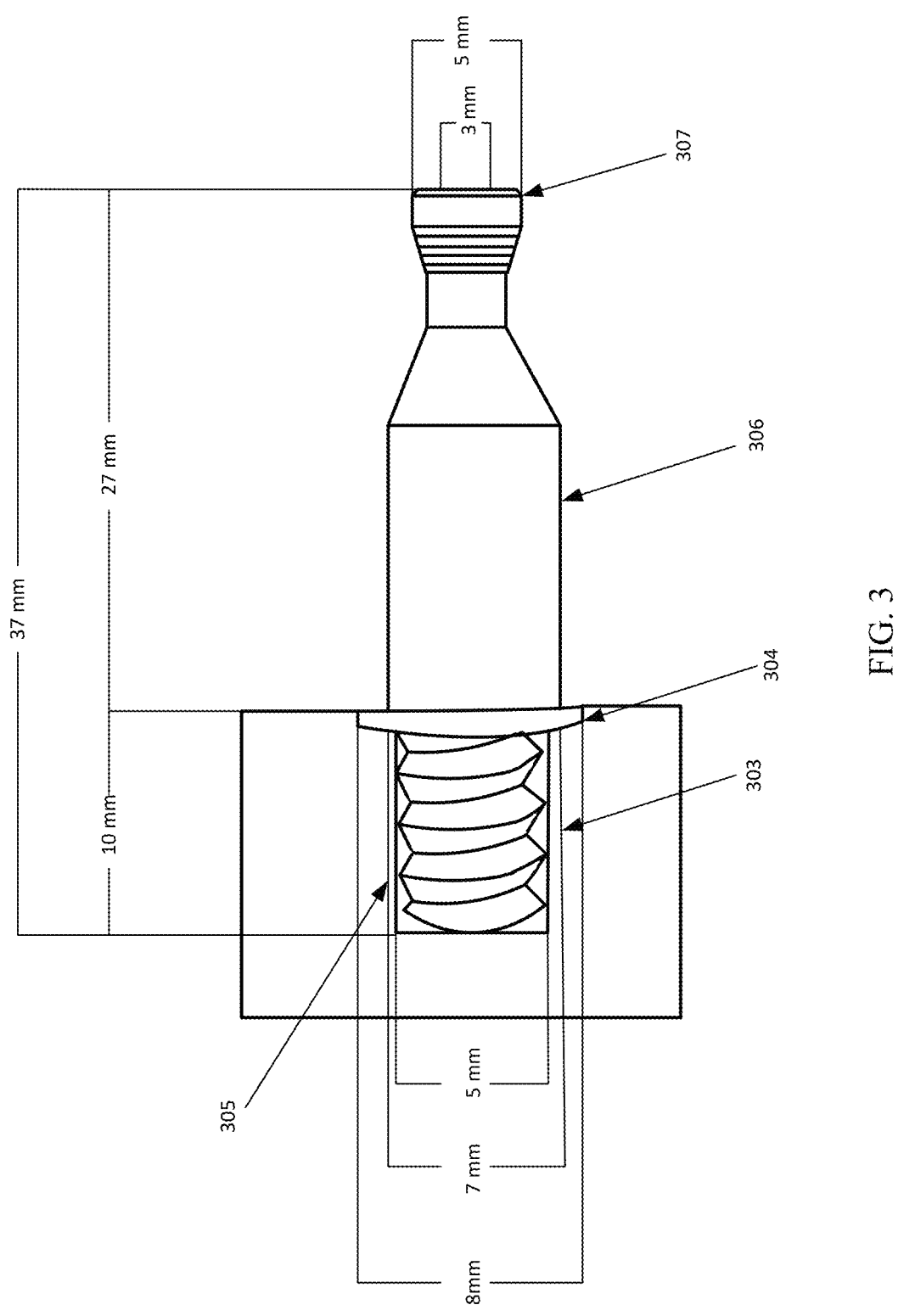
FIG. 3 is a cross section view of the pin screwed into the hole in the first piece of the furniture, according to some implementations of the present disclosure.

FIG. 3 is a cross section view illustrating the insertion of the pin into the first hole in the first piece of the furniture as described in FIG. 2, according to some implementations of the present disclosure. As noted above, a circular hole is drilled in at least one location on the first piece of furniture. As shown in FIG. 3, the first cylindrical portion 303 is inserted into the hole 305, with the flange portion 304 abutting against the outer surface of the of the first piece of furniture. The circular hole 305 may be 10 mm deep with a diameter of 5 mm. As noted above, a second cylindrical portion with a smooth outer surface is connected to the flange portion. As shown in FIG. 3, the second cylindrical portion 306 of the pin may have a diameter of 7 mm and the flange portion 304 may have a diameter of 8 mm. As noted above, the forth cylindrical portion with the second end surface is connected to the second cylindrical trapezoid portion. As shown in FIG. 3, the forth cylindrical portion 307 may have an outer diameter of 5 mm and inner diameter of 3 mm. In examples, the full length of the pin may be 37 mm.

Figure 4:
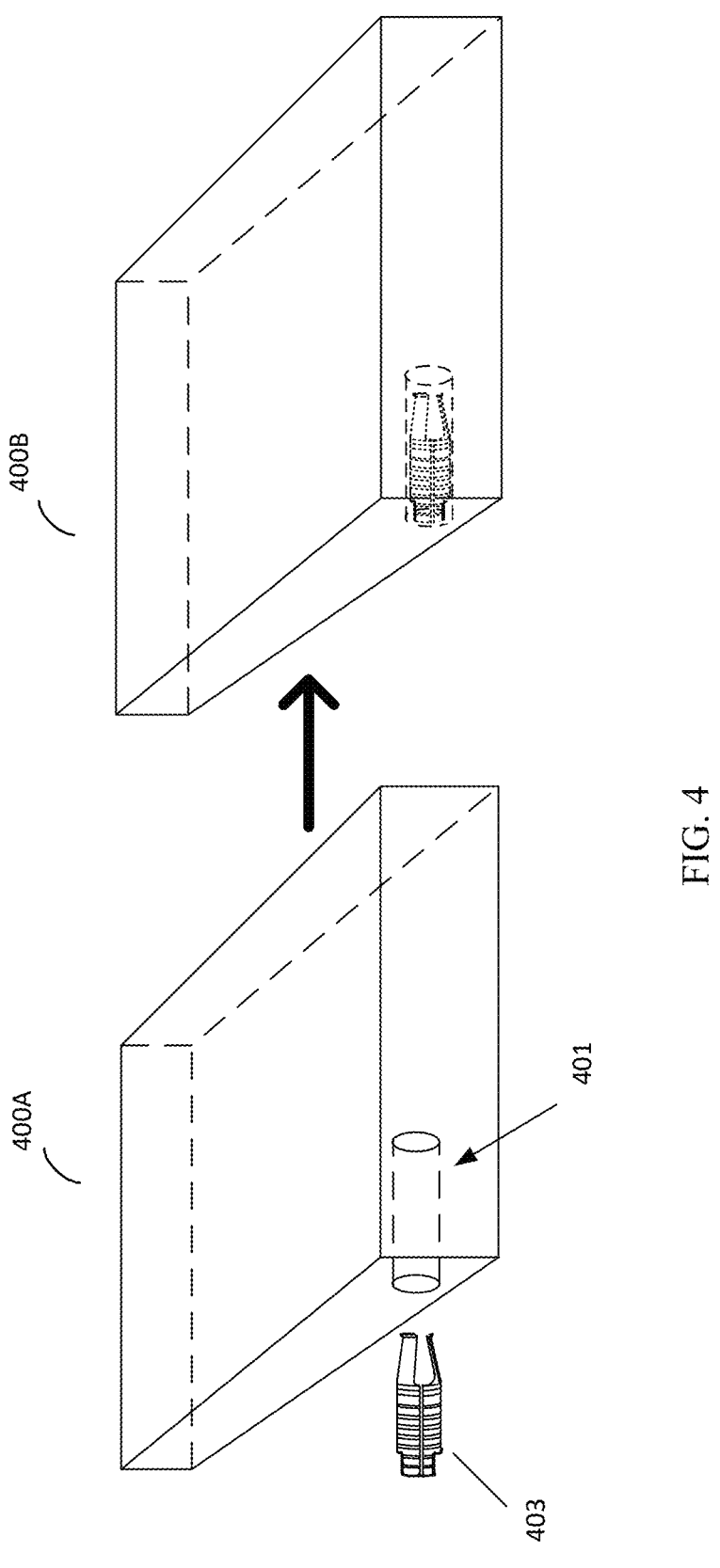
FIG. 4 is a perspective view of the clamp sleeve screwed into a second hole in a second piece of the furniture, according to some implementations of the present disclosure.

FIG. 4 is a perspective view of a process of a clamp sleeve inserted into a second hole in a second piece of the furniture, according to some implementations of the present disclosure. As shown in FIG. 4, at 400A, at least a circular hole 401 is drilled in at least one location of the second piece of furniture 402. A clamp sleeve 403 is then inserted into the drilled hole 401 of the second piece of furniture. Once the clamp sleeve 403 is inserted into the hole of the second piece of furniture, the first sleeve portion threadedly engages the hole through the threaded surface on the first portion 404. The clamp sleeve 403 then may be inserted all the way into the second piece of the furniture. A hammer may be used to force the clamp sleeve into the hole.

Figure 5:
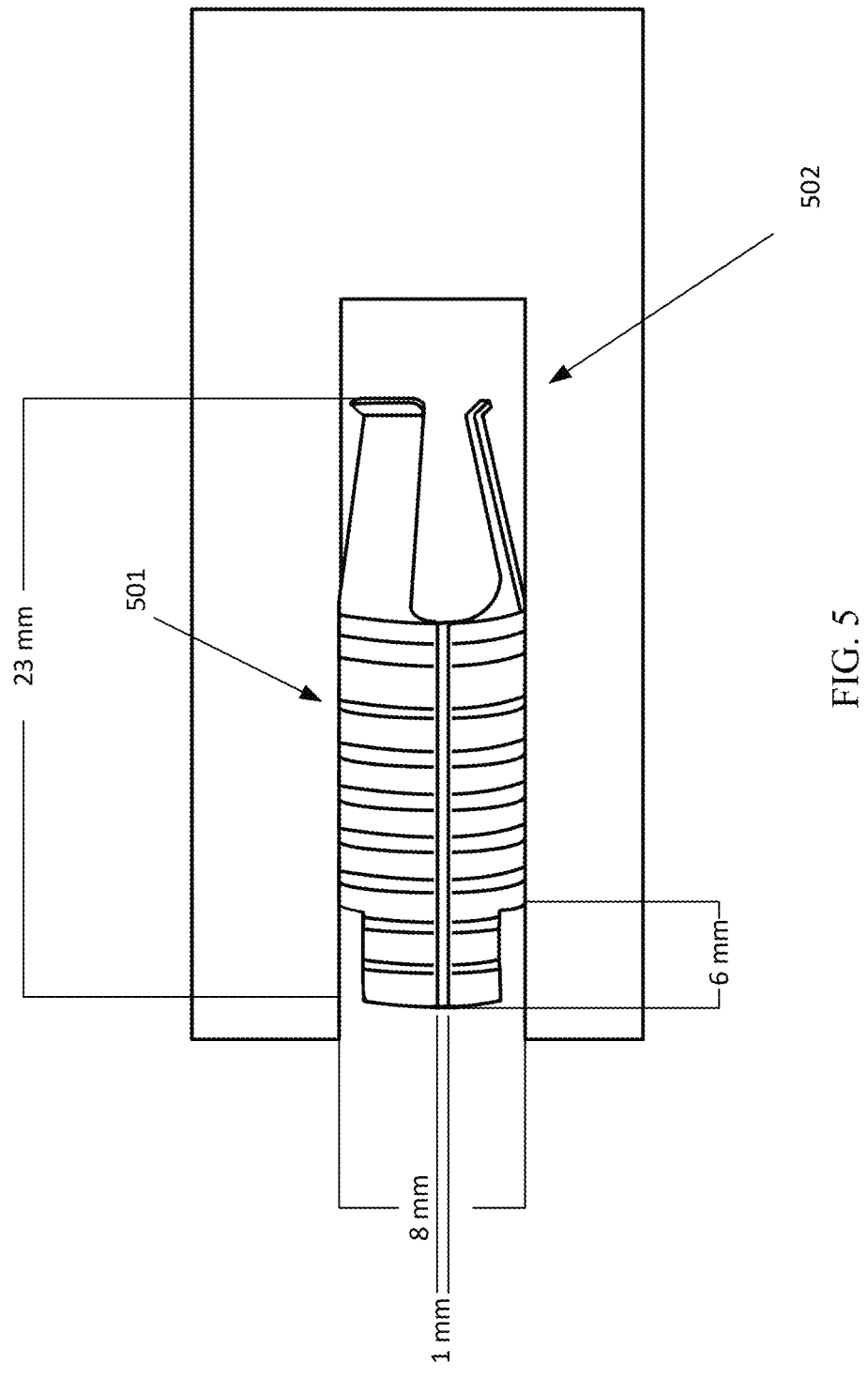
FIG. 5 is a cross section view of the clamp sleeve screwed into the second hole in the second piece of the furniture, according to some implementations of the present disclosure.

FIG. 5 is a cross section view illustrating the insertion of the clamp sleeve into the second hole in the second piece of the furniture as described in FIG. 4, according to some implementations of the present disclosure. As shown in FIG. 5, the clamp sleeve 501 is fully inserted into the hole 502. The full length of the clamp sleeve 501 may be 23 mm with a diameter of 8 mm. As previously mentioned, following the insertion of the clamp sleeve into the hole of the second piece of furniture, the first sleeve portion may engage the hole through its threaded surface. Therefore, to facilitate the threaded engagement of the first sleeve portion with the hole, the drilled hole may also be designated with a diameter of 8 mm. As noted above, a gap space may be extended the full length of the clamp sleeve. As shown in FIG. 5, the gap may be 1 mm wide. The two or more open notches included in the clamp sleeve 501 may be 6 mm long.

Figure 6A:
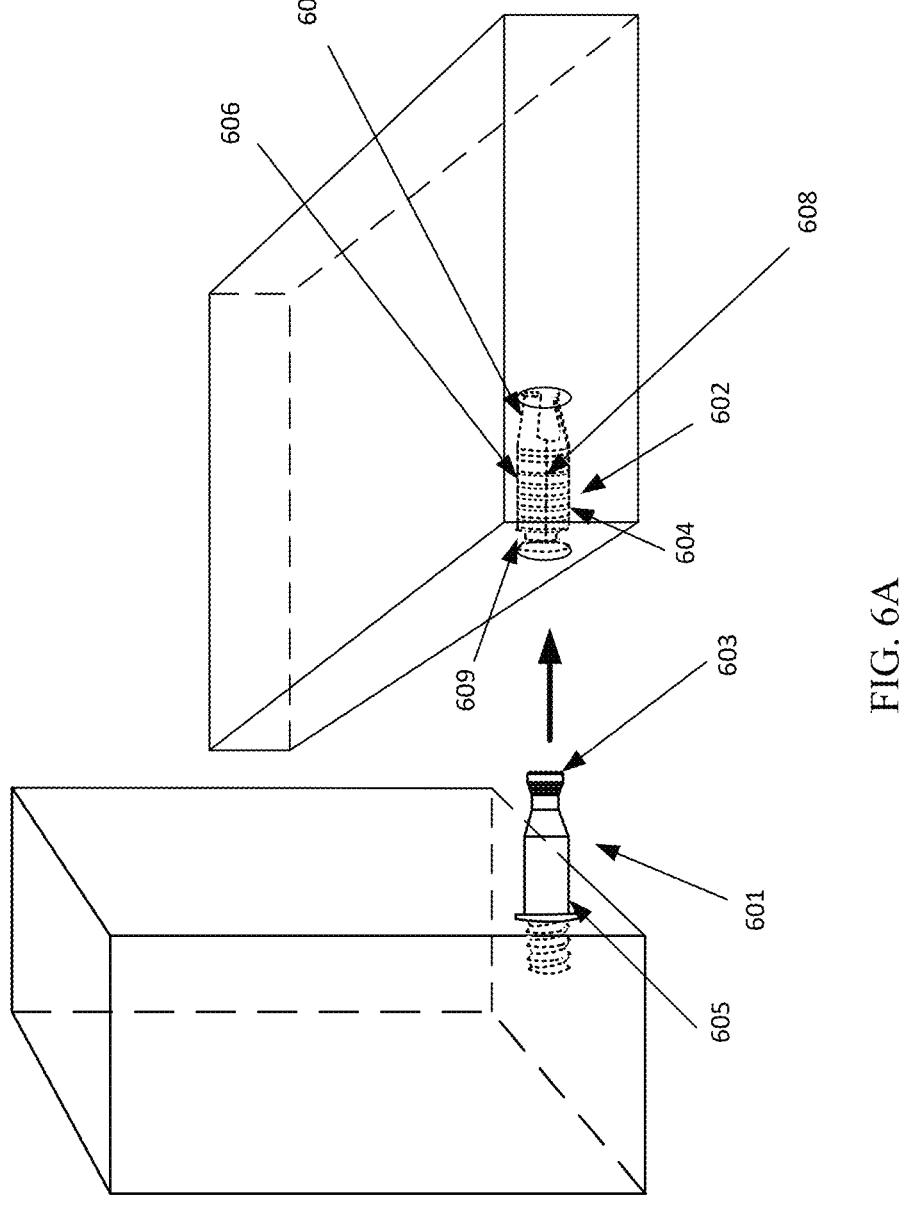
FIGS. 6A and 6B are perspective views of connecting the first piece of the furniture and the second piece of the furniture by inserting the pin into the clamp sleeve.

FIG. 6A is a perspective view of connecting a first piece of a furniture and a second piece of a furniture by inserting the pin of the clamp lock into the clamp sleeve, according to some implementations of the present disclosure. As shown in FIG. 6A, the pin 601 and the clamp sleeve 602 may be assembled to connect the first piece to the second piece of the furniture by inserting the pin 601 into the clamp sleeve 602 inserted in the second piece of furniture. To insert the pin 601 into the clamp sleeve 602, the second end surface 603 of the pin 601 may guide the pin 601 into the first portion 606 of the clamp sleeve 602 and through the second portion 607 of the clamp sleeve 602. Then, the pin 601 is inserted through the hollowed core of the clamp sleeve 602 as the internal thread 604 of the clamp sleeve 602 engages with the cylindrical portion 605 of the pin 601. The body of the clamp sleeve may include a gap 608, which can be a straight gap space of a certain width (e.g., 1 mm). As noted above, gap 608 may extend the full length of the clamp sleeve. As shown in FIG. 600A, the gap 608 may allow radial expansion of the clamp sleeve 602 when the pin is inserted, providing a snug fit and enhancing the overall connection. This feature is beneficial for accommodating the pin and ensuring a secure connection while still allowing for the necessary expansion. Therefore, a tight connection between the first and second pieces of furniture may be achieved. In addition, as shown in FIG. 600A, two or more open notches 609 are included in the clamp sleeve. The open notches 609 may provide a clear path for the pin during assembly, making it easier to insert the pin into the clamp sleeve 602. Further, by having open notches 609 at the receiving end of the clamp sleeve 602, the contact area between the pin 601 and clamp sleeve 602 may be reduced. This can help minimize frictions during the insertion process, allowing for smoother assembly. Moreover, the open notches 609 may provide a visual indicator during assembly, allowing operators to visually confirm that the pin is properly aligned and inserted.

Figure 6B:
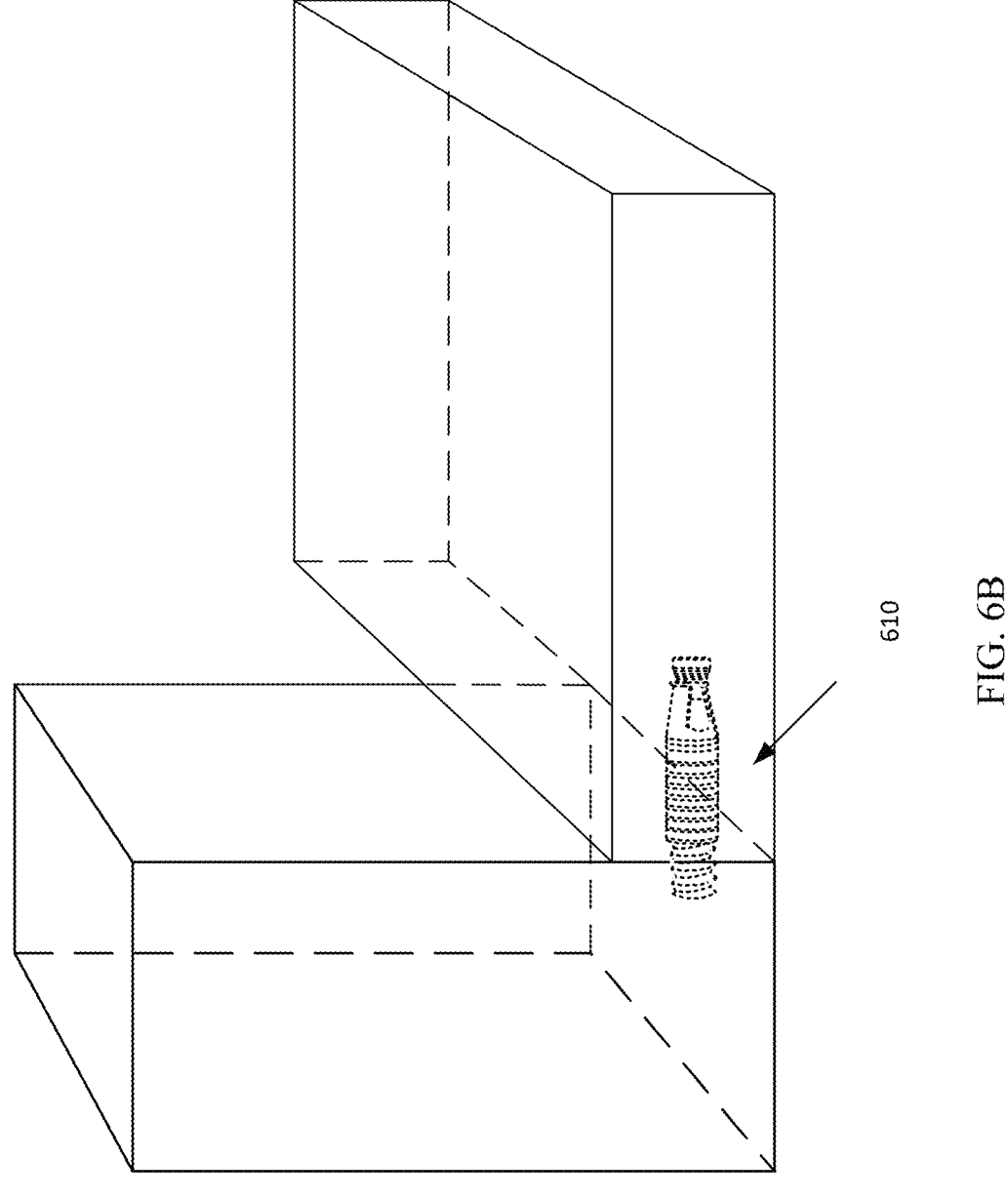

FIG. 6B is a perspective view of the first piece of the furniture and the second piece of the furniture are connected with the pin inserted into the clamp sleeve, according to some implementations of the present disclosure. As shown in FIG. 6B, once the body of the pin is pushed through the hollowed core of the clamp sleeve portion, the pin and the clamp sleeve may be threadedly engaged as a unit 610.

Figure 7:
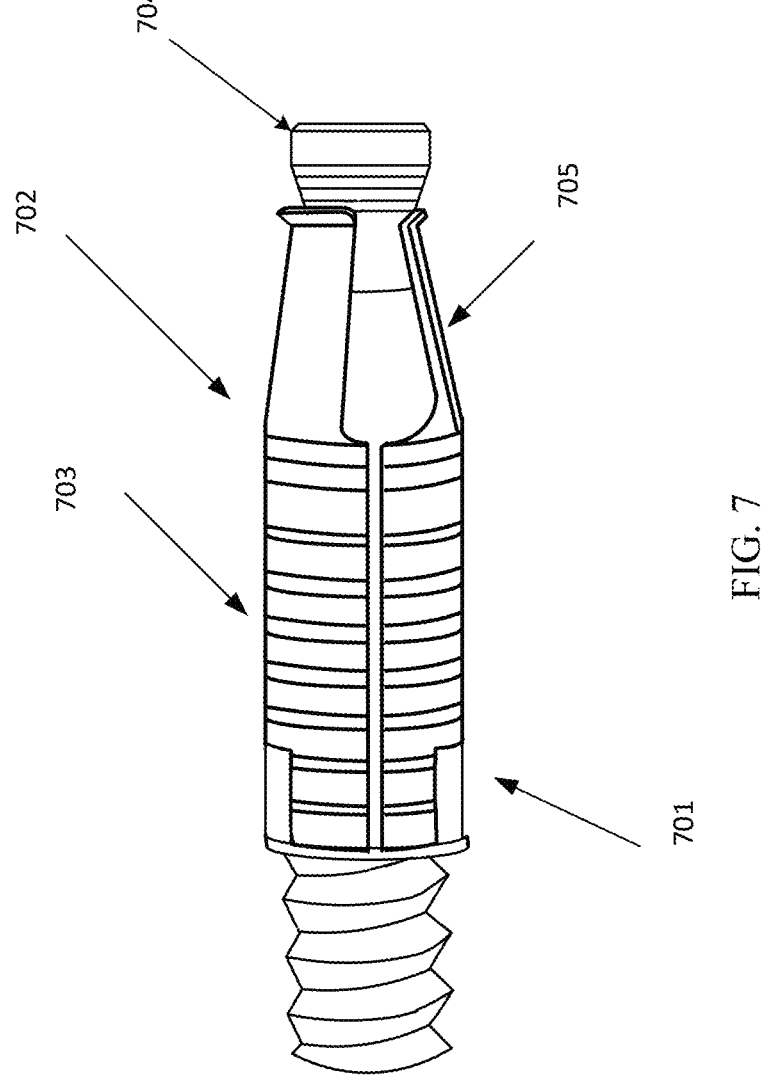
FIG. 7 is a cross section view of the pin inserted into the clamp sleeve, according to some implementations of the present disclosure.

FIG. 7 is a perspective view of the pin of the clamp lock being inserted into the clamp sleeve as described in FIG. 6, according to some implementations of the present disclosure. As shown in FIG. 7, once the body of the pin 701 is pushed through the hollowed core of the clamp sleeve 702, the cylindrical portion 703 is permanently held within the hollowed core of the first portion 201 of the clamp sleeve 702 by welding, brazing, threaded engagement, or the like, subsequent to insertion of the pin 701 within the clamp sleeve 702. As noted above, the clamp sleeve may include a radially enlarged annular rim (flange) arranged to engage with stop the cylindrical portion incident to movement of the pin in the withdrawal direction to prevent withdrawal of the pin from clamp sleeve. As shown in FIG. 7, once the body of the pin 701 is pushed through the hollowed core of the clamp sleeve portion 702, the cylindrical portion 704 (e.g., tip) is held by the flange 705 of the clamp sleeve 702. Therefore, the pin 701 and the clamp sleeve 702 are threadedly engaged as one clamp lock.

Figure 8:
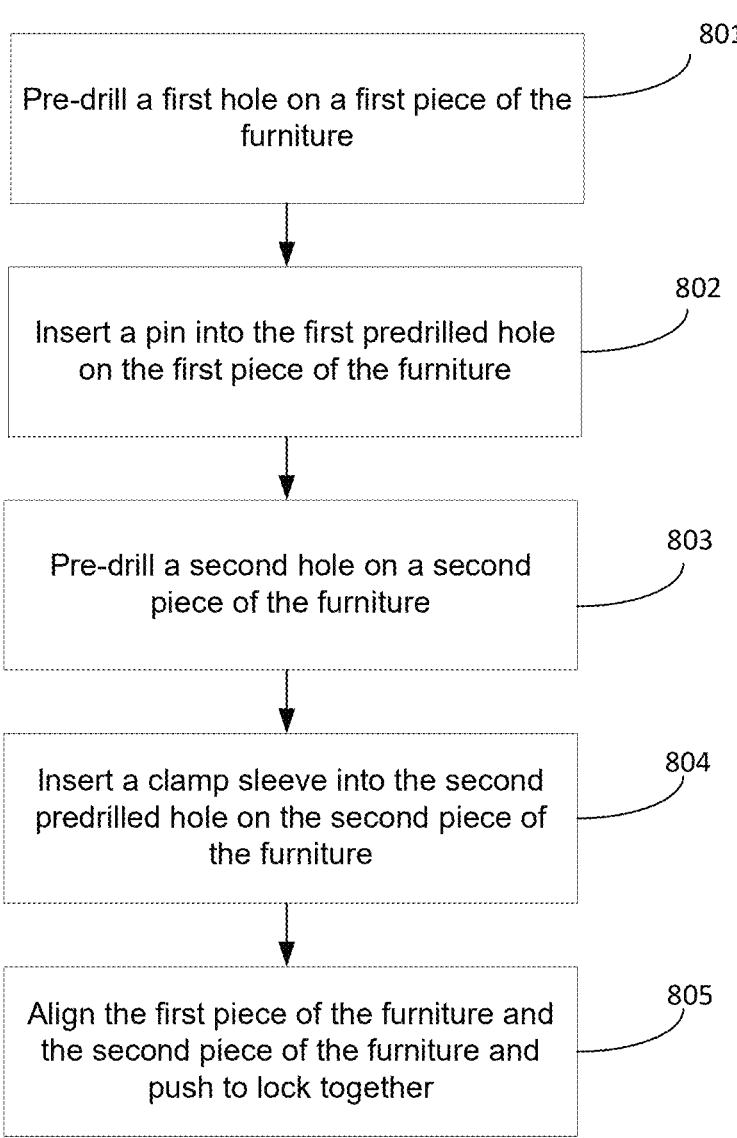
FIG. 8 a flow diagram illustrating a method for connecting the first piece of the furniture and the second piece of the furniture, according to some implementations of the present disclosure.

FIG. 8 is a flow diagram illustrating a method for assembling furniture components by inserting a pin (e.g., first connection element 100A of FIG. 1) of the connector 100 into a clamp sleeve 200A in the first part, according to implementations of the present disclosure. At 801, a first piece of furniture is prepared for the insertion of a pin by pre-drilling a hole into it. Subsequently, at 802, the pin may be inserted into the predrilled hole on the first piece of furniture. A screwdriver may be used to screw the pin into the hole or a hammer can be used to force the pin into the hole. At 803, a second piece of furniture is readied for the attachment of a clamp sleeve by pre-drilling a hole into it. At 804, the clamp sleeve may be inserted into the predrilled hole on the second piece of furniture. At 805, the pin and the clamp sleeve may be aligned and subsequently assembled by applying force to securely interlock them. This process effectively connects the first piece to the second piece of the furniture.

In various embodiments, the expeditious on-site assembly of the first and second furniture pieces may be facilitated, wherein the components seamlessly interconnect through a quick and straightforward snapping mechanism, completing the assembly within seconds. The utilization of the clamp lock in this process may result in reduced labor and equipment costs, eliminating the need for additional tasks such as puttying of nail holes and preventing damage to trim through nailing. Consequently, this innovative assembly method mitigates high transport costs associated with labor-intensive procedures, enhancing overall efficiency and cost-effectiveness.

In certain embodiments, the clamp lock finds utility in diverse applications such as cabinet connectors, drawer boxes, shelving, and bookcases. Notably, the clamp lock proves particularly advantageous in streamlining the installation process of substantial wooden steps onto wooden substructures, significantly enhancing the efficiency and effectiveness of such installations.

Reasonable variation and modification are possible within the scope of the foregoing disclosure, the drawings, and the appended claims without departing from the spirit of the invention.

Language: In the foregoing descriptions, numerous details are set forth. It will be apparent, however, to one of ordinary skill in the art having the benefit of this disclosure, that the present disclosure may be practiced without all of these specific details. In some instances, well-known structures and devices are shown in block diagram form, rather than in detail, in order to avoid obscuring the present disclosure.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The invention claimed is:

1. A clamp lock for connecting a first piece to a second piece of a furniture, comprising:

a pin, wherein the pin comprises a first end surface and a second end surface, and a plurality of portions that are connected between the first end surface and the second end surface; and a clamp sleeve, wherein the clamp sleeve comprises a hollowed core through a full length of the clamp sleeve, and the clamp sleeve comprises a first portion and a second portion that is connected to the first portion, and wherein the first portion comprises a hollow cylinder, and the second portion comprises a plurality of clamp tongues, each of the plurality of clamp tongues comprising:

a first end being connected to the first portion of the clamp sleeve; and a second end comprising a flange, wherein the first end of each of the plurality of clamp tongues is connected to an annular ring of the first portion of the clamp sleeve, and wherein the plurality of clamp tongues are tilted toward a central axis, the second ends of the plurality of clamp tongues form an internal circular hole with a radius that is smaller than an internal radius of the annular ring.

2. The clamp lock of claim 1, wherein the plurality of portions of the pin comprise:

a first cylindrical portion comprising the first end surface and a threaded outer surface;

a second flange portion connected to the first cylindrical portion;

a third cylindrical portion comprising an unthreaded outer surface and being connected to the second flange portion;

a fourth cylindrical trapezoid portion comprising an unthreaded outer surface and being connected to the third cylindrical portion;

a fifth cylindrical portion comprising an unthreaded outer surface and being connected to the fourth cylindrical trapezoid portion;

a sixth cylindrical trapezoid portion comprising a threaded or unthreaded outer surface and being connected to the fifth cylindrical portion; and a seventh cylindrical portion comprising an unthreaded outer surface and the second end surface, and being connected to the sixth cylindrical trapezoid portion.

3. The clamp lock of claim 1, wherein the first portion and second portion of the clamp sleeve are made of a first metal, and the pin is made of a second metal.

4. The clamp lock of claim 3, wherein the first metal and the second metal are an identical material, or the first metal and the second metal are different materials.

5. The clamp lock of claim 1, wherein the first portion of the clamp sleeve comprises a threaded outer surface, an external radius, an internal radius that is smaller than the external radius, wherein the first portion further comprises a gap space extending the full length of the clamp sleeve, and wherein the first portion further comprises a first and a second part, the first part comprising two or more opening notches and two or more solid pieces being connected to the second part, and the second part being connected to the second portion of the clamp sleeve.

6. The clamp lock of claim 1, wherein the pin is molded from at least one of metal, steel, or aluminum; wherein the clamp sleeve is molded from at least one of metal, steel, or aluminum.

7. The clamp lock of claim 1, wherein in connecting the first piece to the second piece of the furniture, the second end surface of the pin is inserted into the first portion of the clamp sleeve and through the second portion of the clamp sleeve.

8. A method for connecting the first piece to the second piece of the furniture using the clamp lock of claim 1, the method comprising:

insert a first portion of the pin into a first drill hole in the first piece of the furniture;

insert the clamp sleeve into a second drill hole in the second piece of furniture; and insert a second portion of the pin into the clamp sleeve inserted in the second piece of furniture and connect the first piece of the furniture and the second piece of the furniture.

* * * * *